United States Patent [19]

Tenne et al.

[11] 4,354,753

[45] Oct. 19, 1982

[54] REFLEX CAMERA HAVING A FOCAL PLANE SHUTTER AND AN INTERCHANGEABLE VARIABLE SHUTTER OBJECTIVE

[76] Inventors: Lave Tenne, 434 Kungsbacha, Sweden; Franz Starp, Mittlere Steige 36, Wildbad; Walter Holzapfel, Richard-Wagner-Strasse 42, both of Fed. Rep. of Germany

[21] Appl. No.: 261,535

[22] Filed: May 7, 1981

[30] Foreign Application Priority Data

Apr. 30, 1980 [DE] Fed. Rep. of Germany ......... 301640
Nov. 28, 1980 [DE] Fed. Rep. of Germany ....... 3044882

[51] Int. Cl.$^3$ ............................................. G03B 9/00
[52] U.S. Cl. .................................. 354/232; 354/236; 354/289
[58] Field of Search ............... 354/228, 231, 232, 233, 354/236, 289, 272

[56] References Cited

U.S. PATENT DOCUMENTS 3,610,126 10/1971 Mielke .......................... 354/232 X
3,648,588 3/1972 Alfredsson et al. ............ 354/236 X

*Primary Examiner*—John Gonzales

[57] ABSTRACT

Reflex camera having a focal plane shutter in the camera body and a time adjuster associated with the focal plane shutter, and an interchangeable variable central shutter objective and a time adjuster associated with the central shutter, the focal plane shutter adjuster having a setting position "C" (central shutter) in which the central shutter of the objective can be used for exposure settings, and the objective shutter adjuster having a setting position "F" (focal plane shutter) in which a lock is operated to block the closure drive of the shutter segment system of the central shutter so that the focal plane shutter can be used.

10 Claims, 8 Drawing Figures

REFLEX CAMERA HAVING A FOCAL PLANE SHUTTER AND AN INTERCHANGEABLE VARIABLE SHUTTER OBJECTIVE

The present invention relates to a reflux camera having a focal plane shutter, a time adjuster associated with the focal plane shutter and which can be set to a particular position "C", and an interchangeable variable shutter objective which has a segment system which, in the basic position, fully clears the lens aperture of the objective and is mounted so as to be able to pivot backwards and forwards. The objective also has a time adjuster which has a set position "F" with "B" function, and a diaphragm which, before the segment system commences its operating movement, approaches a specific working aperture, which is preselectable by means of a diaphragm adjuster.

A reflex camera is already known which, because it does not itself have a shutter system, can only use that type of interchangeable objective which has a central interlens shutter and diaphragm, the diaphragm concept and arrangement being selected so that the diaphragm blades open fully when the shutter is cocked and move to a preselected aperture width in an automatically controlled manner upon the release of the shutter and before the central shutter opens and closes again.

A reflux camera is also alread known which is provided with a focal plane shutter and to which interchangeable objectives of various types are selectively attachable, these objectives in fact being both interchangeable objectives which have only one diaphragm and interchangeable objectives of the above described type having a central shutter and diaphragm.

Interchangeable objectives of the first-mentioned category, which merely have a diaphragm and consequently may also only be used with focal plane shutter cameras, are, as is well known, of such a technical concept that, when the camera is released, the diaphragm blades spring from the fully open position towards the aperture width which corresponds to a manually preselected value and retain this aperture for the duration of the operating movement of the focal plane shutter in order to return again to the fully open position immediately afterwards, whereby the objective passage for observing the image is completely clear again.

If, however, an interchangeable objective which has a central shutter and diaphragm is in fact attached to a reflex camera which is fitted with a focal plane shutter, and if the camera user intends to take flash photographs with an extremely short exposure time, which photographs presuppose the use of an electronic flash device using the central shutter on the objective then, as explained in German Patent Specification No. 2 001 406, before taking the picture, he firstly has to set the time adjuster, which is on the camera body and which is provided with an additional set position "C" (central shutter), for the focal plane shutter correspondingly to this position "C". With this setting operation an electromechanical control device is actuated which, after the camera has been released, clears the focal plane shutter prematurely for the full aperture and permits it to return to the closed position only after the central shutter has functioned. If, however, the camera user wishes to take photographs which require the use of the focal plane shutter, then he has first to set the time adjuster of the central shutter to the particular set position "F" with "B" shutter function. This setting operation in turn acts upon the electromechanical control device in such a way that the movement procedure of the focal plane shutter is delayed until the central shutter has reached the fully open position, from which it returns again to the closed position.

When taking photographs with such a camera provided both with a central shutter and with a focal plane shutter, it is disadvantageous to the camera user if the central shutter on the objective always fully closes again at the end of the exposure to fulfil its function, while the diaphragm remains at its set value, since the camera user does not have at his disposal a ground-glass screen image until the camera is again ready to take photographs by actuating the cocking mechanism and, as a result thereof, the central shutter has again been transferred to the open position.

The object of the invention is to eliminate the disadvantage discussed above of a variable shutter objective which is provided with a diaphragm and central shutter, i.e. to modify such a shutter in such a way that:

(a) as in the case of interchangeable objectives provided only with a diaphragm, the ground-glass screen image is available again through the focal plane shutter directly subsequent to the exposure operation, and (b) with a low cocking moment and with regular use of the focal plane shutter and central shutter, a long service life is insured for the camera and the objective shutter.

According to the present invention there is provided a reflex camera having a focal plane shutter, a time adjuster associated with the focal plane shutter and which can be set to a particular position "C", and a variable shutter objective, which has a shutter segment system which, in the basic position, fully clears the lens aperture of the objective and is mounted so as to be able to pivot backwards and forwards, and a time adjuster associated with the objective shutter which can be set to a particular position with "B" function, and a diaphragm which, before the shutter segment system commences the operating movement, approaches a specific working aperture which is preselectable by means of a diaphragm adjuster, wherein by setting the time adjuster associated with the central shutter of the objective to the set position "F" which effects an "B" function, a lock is operated which blocks the closure drive for the shutter segment system.

Compared with known shutters of this type, an objective shutter having this feature according to the present invention enjoys the advantage that the ground-glass screen image is available again immediately after the exposure operation has ended. It is also advantageous if, on the one hand, by not involving the central shutter in the operating procedure of the camera when taking photographs through the focal plane shutter, an additional tensioning moment for transferring the central shutter to the cocked condition does not need to be applied and, on the other hand, the service life of the central shutter can be extended because of the consequential lack of stress and the resultant sparing of the central shutter from extra operating wear to which it would be otherwise subjected.

In a preferred embodiment of an objective shutter arrangement according to the present invention, which is advantageous from the design point of view and insures an absolutely problem-free use of the camera, the objective shutter can have an adjuster which is provided with radial cams which serve to clear a spring-loaded feed lever, which acts upon the diaphragm in the closing direction, and to clear and return a further return lever, which is likewise spring-loaded and acts upon the diaphragm in the opening direction, to the initial position. The return lever may have a lock which keeps it in the initial position and can be driven out of the locked position by the adjuster after a first phase of motion ($\alpha$), i.e. and a short intermediate stop, i.e. in motion, necessary for the functioning of the focal plane shutter on the camera body, in a second phase of motion ($\beta$), i.e. beta.

Further, for the manual actuation of the diaphragm for the purpose of observing the depth of focus, the radial cam, which releases the feed lever into the initial position, may be disposed on a pin-mounted lever and this lever may be disposed on the adjuster so as to be resiliently flexible. Consequently, the camera user is then able to change the diaphragm manually from the fully open position to the preselected aperture width and/or to view the object while judging the depth of field.

An arrangement which positively excludes operating errors and is also easy to handle for the manual adjustment of the diaphragm can be achieved according to the present invention, in that the pin-mounted lever, which is provided with a radial cam, may have a push-button or the like which serves to actuate the feed lever manually.

In order to prevent an unintentional setting of the time adjuster, belonging to the central shutter, to the set position "F" which, from the point of view of its functional significance, differs basically from the other scale values, and to secure the time adjuster in the set position "F" so that a return from this position can only ever be effected deliberately by the camera user, a lock mechanism is preferably provided with the time adjuster for the central shutter, so that a setting of the adjuster to the set position "F" or correspondingly a return from this position to a time value can only be effected after a previous actuation of the lock mechanism, whereby incorrect settings of the camera can be avoided in a simple manner and also with absolute certainty.

A preferred embodiment of the lock mechanism, which is both structurally simple and reliable in operation, is achieved if this mechanism is designed according to the present invention as a spring-loaded, double-armed lever which is actuated by a push-button and cooperates with an annular groove, corresponding to the extent of the time range of the time adjuster, and with a specific additional recess which fixes the time adjuster in the set position "F".

The present invention will be described further, by way of example, with reference to the accompanying drawings, in which.

Figure 1:
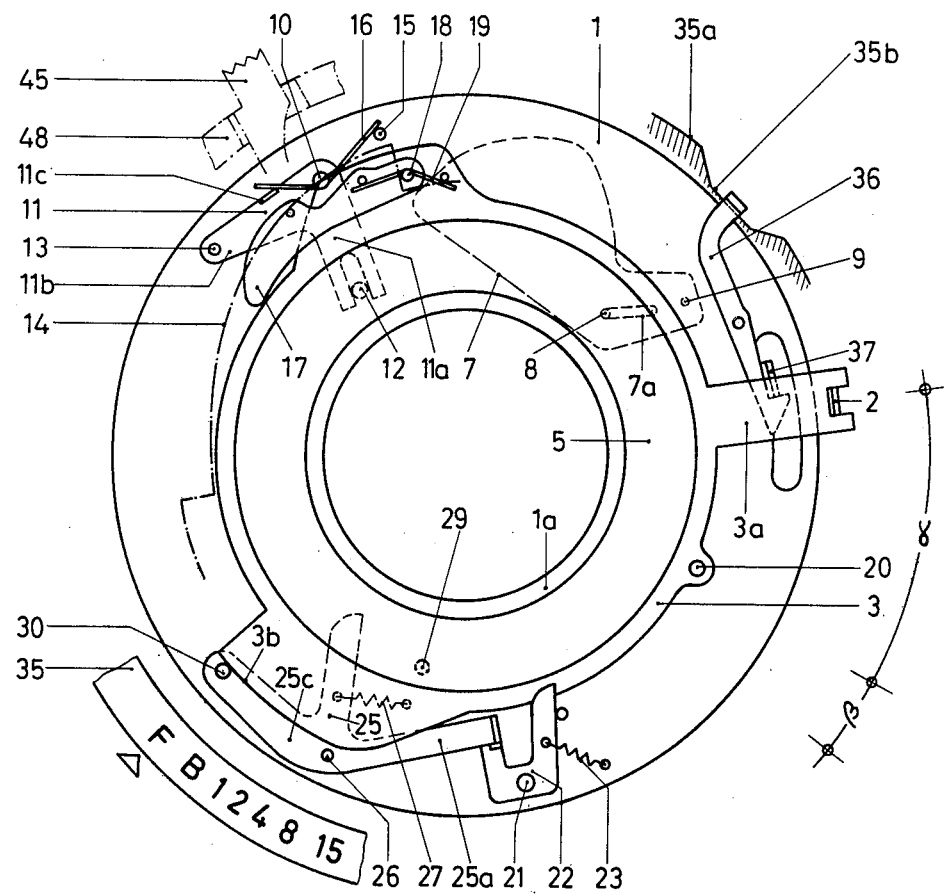
FIG. 1 shows the diaphragm drive of a variable shutter in the initial position.

In the drawings, the reference numeral 1 denotes the base plate of a central shutter which is suitable for installation in a variable objective and is provided with a cocking and releasing member which, when the variable objective or variable shutter is attached to the housing of a reflex camera by way of a shaft, can be disengaged from the transmission of the cocking and releasing mechanism on the camera body by removing the objective or shutter. Positively connected to the annular cocking and releasing member, which is rotatably mounted on the rear side of the base plate 1, and of which only one coupling part 2 can be seen in the drawing, is an adjuster 3 on which a radially directed arm 3a, which engages with the part 2, is disposed.

The adjuster 3 is rotatably mounted in a conventional manner on a concentric extension 1a of the base plate 1. It serves specifically to control a backward and forward movement of the iris ring or diaphragm ring 5, which is likewise mounted on the extension 1a and is effectively connected to diaphragm blades 7 rigidly mounted at 9 in a conventional manner by means of a slot and pin connection 7a, 8. For reasons of clarity, only one diaphragm blade 7 is shown, of which there are usually five in number, and which are distributed around the aperture and, as shown in the drawing, are disposed beneath the base plate 1.

Figure 2:
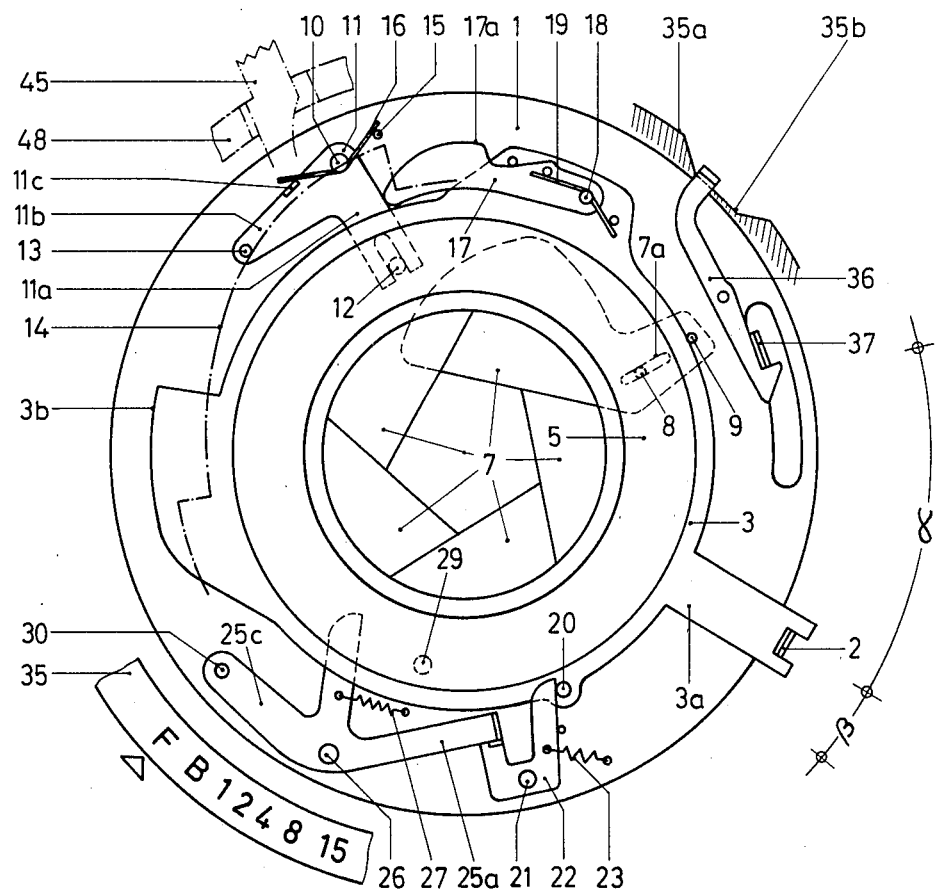
FIG. 2 shows the diaphragm set to the preselected aperture width after completion of the $\alpha$, i.e. alpha, phase of motion.
Figure 3:
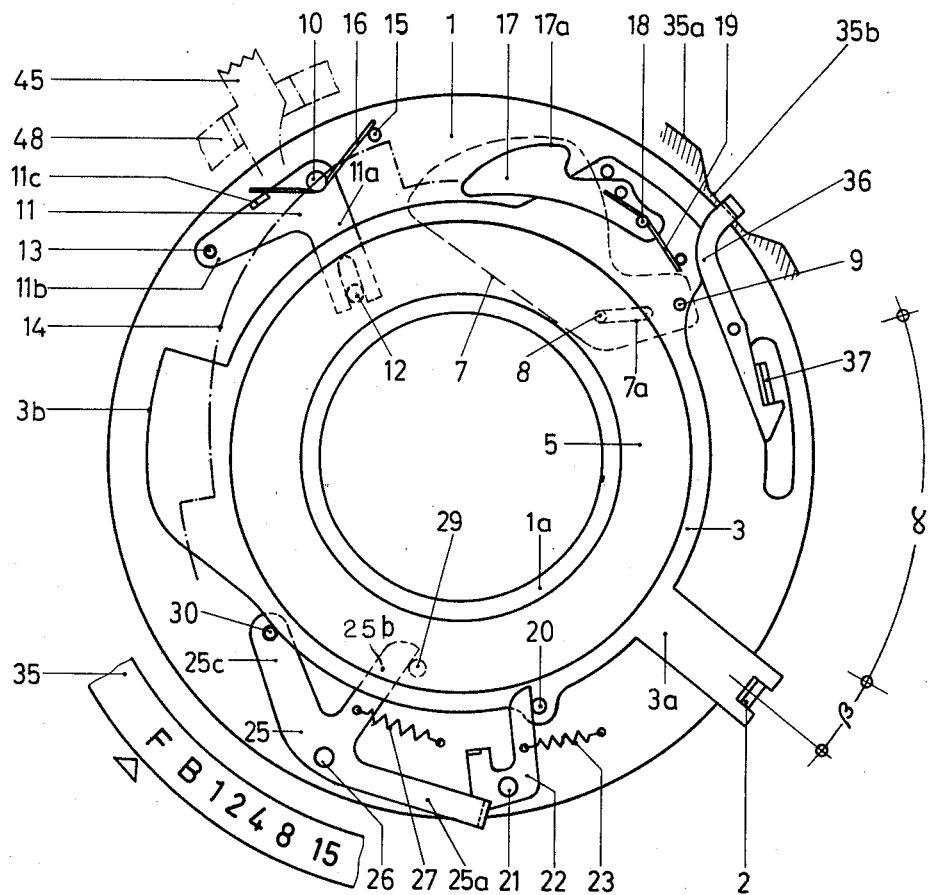
FIG. 3 shows the diaphragm returned to the initial position or correspondingly the open position after the completion of the $\alpha$ and $\beta$, i.e. alpha and beta, phases of motion.

On the side facing the viewer, the iris ring 5 is provided with a driving pin 12 which is drivingly connected to one end of a feed lever 11, which is mounted on the base plate 1 by means of pin 10 and is designed as an angled lever, the lever arm 11a, which is fork-shaped at the free end, positively embracing the pin 12 for this purpose. The end of the other lever arm 11b is in turn provided with a stop pin 13, which cooperates with a radial cam 14 which, in FIGS. 1 to 3 is indicated by dash-dot lines and, is presettable by means of a diaphragm adjuster which is manually actuable, but is not shown fully in these views. This occurs in such a way that, due to the effect of the driving spring 16, which is supported at one end on a tab 11c and at the other end on a rigid pin 15 on the base plate 1 with an initial tension, the feed lever 11, which in the position of rest lies on a supporting part which is more fully described hereinafter, experiences an anticlockwise rotational movement about the bearing pin 10 with the simultaneous driving of the iris ring 5, this rotational movement continuing until the stop pin 13 meets the radial cam 14. This in turn signifies that, depending upon the relative set position of the radial cam 14, the feed lever 11 passes through a greater or smaller angle of rotation range and thereby sets the diaphragm blades 7 to a specific aperture width, as shown, for example in FIG. 2, by way of the iris ring 5, from the fully open position shown in FIG. 1.

The feed lever 11 could per se be supported by a radial cam which is securely disposed on the adjuster 3 and engages with the tab 11a but, in order to enable an intermediate observation of the depth of field, provision is made for the radial cam 17a to be disposed on a lever 17 which, for its part, is rotatably mounted on the adjuster 3 by means of a bearing pin 18 and abut the tab 11a of the feed lever 11 under the influence of a spring 19 which is under relatively high initial tension.

The object of the control lever 17 is to support the feed lever 11 in the initial position so that the feed lever 11 also retains its position under the compression force of the spring 16 which acts upon it. The initial tension of the spring 19 must therefore be selected to be higher than that of the spring 16. It follows from this that, when the adjuster 3, driven by the cocking and releasing member, leaves the initial position shown in FIG. 1 and the radial arm 3a passes through the α, i.e. alpha, phase of motion as far as an intermediate stop located at the end thereof, the feed lever 11 follows the radial cam 17a and thereby sets the diaphragm blades 7 to the preselected aperture width fixed by the position of the diaphragm radial cam 14. Once the end of the α, i.e. alpha, phase of motion is reached, the operating movement of the adjuster 3 is interrupted for an interval of time within which the focal phase shutter in the camera body opens exposing the film material at the set diaphragm aperture width. After the operation of the focal plane shutter, the adjuster 3, again driven by the cocking and releasing member, continues its rotational movement, whereby a driving pin 20, disposed on the adjuster 3a, approaches a locking catch 22, which is rotatably mounted on the base plate 1 by means of pin 21 and drives this catch 22 against the action of a spring 23 associated with the catch 22 and thereby releases a multi-armed lever 25 which acts as a return lever for the diaphragm blades 7.

The return lever 25, which was previously supported by its arm 25a against the locking catch 22, is now under the tensioning effect of a spring 27 which now acts with the lever arm 25b upon a driving pin 29 located on the iris ring 5, and drives this driving pin 29 along with it, thereby returning the diaphragm blades 7 into the open position shown in FIG. 3. The adjuster 3 thus passes through the β, i.e. beta, phase of motion entirely and stops at the end thereof.

If, subsequent to the above described movements the cocking transmission on the camera body is actuated, a torque is applied via the shaft connection which rotates the adjuster 3 counter-clockwise and acts upon the cocking and releasing member of the shutter, this member being disposed on the shutter side. During the return of the adjuster 3, a fixed radial cam 3b on the adjuster 3 approaches a pin 30 on the free end of a lever arm 25c, disposed on the return lever 25, whereby the return lever 25 is displaced progressively from the position shown in FIG. 3 towards the cocked position shown in FIG. 1. This cocked position is reached when the locking catch 22 is again located under the bent-over tab of the lever arm 25a under the tensioning effect of the spring 23, as indicated in FIG. 1. Once the end position of the adjuster 3 has been reached, the radial cam 17a (cf. FIGS. 2 and 3), as can also be seen from FIG. 1, adopts a position relative to the feed lever 11, in which position the tab 11a of the feed lever 11 is actually located on the cam 17a.

The prerequisite for achieving the above described mode of operation is, however, that the time adjuster 35 of the central shutter, indicated only symbolically in FIGS. 1 to 3, has been set, as shown, before the release of the camera to an additional set position denoted, for example, by "F" (focal shutter). If this happens, a radial cam 35a, which is also only indicated in the drawing which and is nonrotationally connected to the time adjuster 35, receives such a setting relative to a rigidly mounted locking lever 36 that this locking lever can engage with a driving tab 37, which is disposed on the shutter segment ring of the shutter, and can thus prevent the central shutter from fulfilling its function. For this purpose, the radial cam 35a is provided with a radial recess 35b which enables the locking lever 36 to enter the locked position.

In order to give the camera user the opportunity of making an intermediate observation so as to judge the depth of focus with the preselected diaphragm aperture in the set position "F" of the time adjuster 35 with the above described arrangement of diaphragm mechanics, a push-button 45 is provided which is disposed securely, but resiliently flexibly, on a lever 46 which sits on a bearing pin 47 inserted in the base plate 1. In this case, the resiliently designed push-button 45 is guided in a slot-like recess 48a of the shutter housing 45, which is merely indicated in FIGS. 4 and 5, this being so that, when the push-button 45 is pressed down and the spring 49, which engages therewith, is overcome, the outer end of the lever 46 acts upon an adjusting pin 50, which is disposed on the control lever 17.

In turn, this adjusting pin 50 transfers the compression force to the control lever 17 which executes a rotational movement in a counter-clockwise direction about the bearing pin 18, resulting in the feed lever 11 losing its support. In this case, under the pressure of the pretensioned spring 16, the feed lever 11 follows the control lever 17 until such time as the stop pin 13 comes to rest on the radial cam 14. Consequently, in turn, the diaphragm blades 7, which participate in the adjusting movement of the feed lever 11 via the iris ring 5, have reached the aperture width corresponding to the preselected diaphragm valve.

Figures 4, 5:
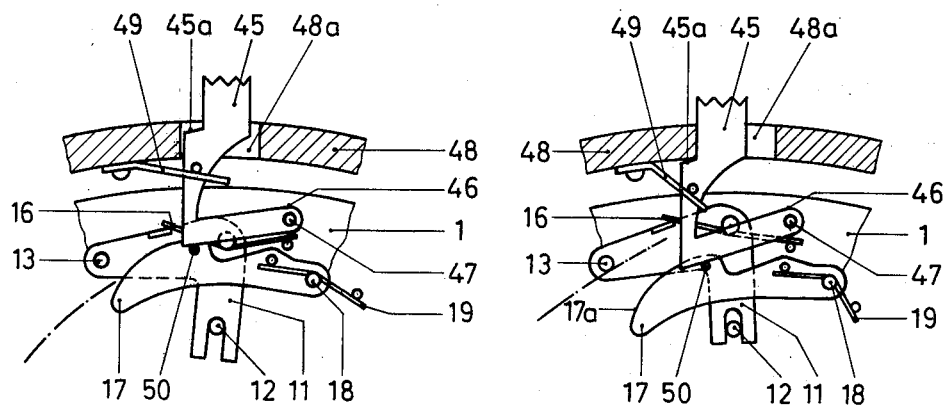
FIG. 4 shows the unactuated push-button for setting the diaphragm manually to a preselected aperture width.
FIG. 5 shows the push-button of FIG. 4 after it has been actuated into the locked position.

In order to be able to keep the push-button 45 in the active position for undertaking further setting manipulations which have to be effected on the camera, a locking edge 45a is provided thereon which, as shown in FIG. 5, engages with the housing 48a at the end of the push-button actuation and consequently locks the button 45 until such time as it is able to return again into the initial position, shown in FIG. 4, by a transversely directed pressure stress, causing lateral deflection to be exerted upon the button 45. With the return of the push-button 45, the pressure is absorbed by the control lever 17, this pressure acting upon the feed lever 11 under the influence of the relatively strong spring 19 by way of the tab 11a and consequently returning the diaphragm blades 7 again from the pre-selected aperture width to the fully open position according to FIG. 1.

Figure 6:
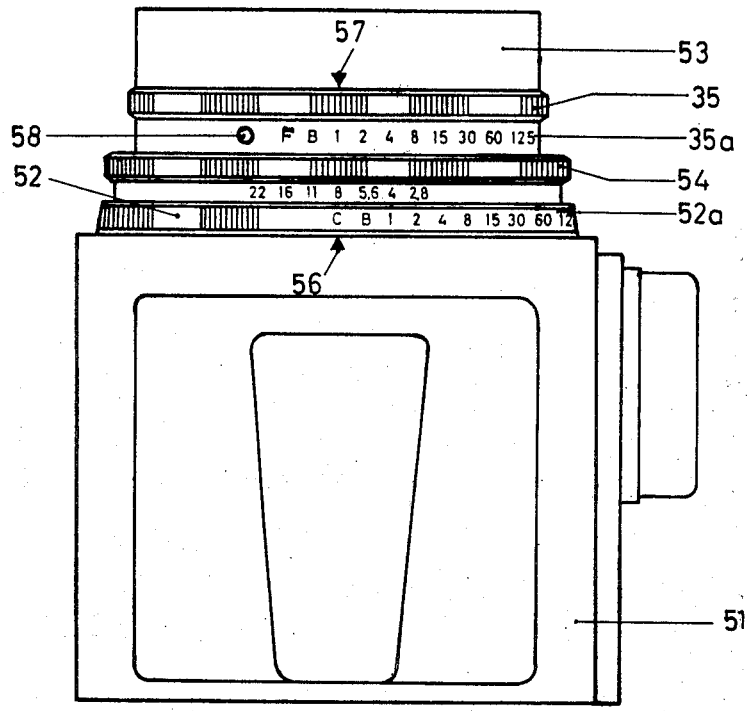
FIG. 6 shows a variable shutter objective and the front portion of a reflex camera seen from above.

FIG. 6 shows the housing 51 of a reflex camera which comprises a focal plane shutter with a time adjusting ring 52 and a variable shutter objective 53 which can be detachably attached to the camera housing 51 by means of a bayonet connection, the objective being designed with a central shutter and provided with a diaphragm mechanism and a segment system, i.e. of shutter segments, which is mounted so as to pivot backwards and forwards, and which is preferably driven mechanically. Disposed concentrically to the objective barrel are rotatably mounted adjuster rings 54 and 35 of which one adjuster, denoted by 54, serves to pre-select the diaphragm aperture width and the other serves to set the exposure time.

As can be seen from FIG. 6, the time adjuster 52, belonging to the focal plane shutter, is provided additionally with a particular set position "C" (central shutter) in addition to the actual time scale 52a, and the time adjuster 35, belonging to the central shutter, is provided with a particular set position "F" (focal shutter), i.e. which effects a "B" function, in addition to the time setting scale 35a. The purpose of this is to enable the camera user to be in a position to expose one or other shutter arrangement, depending upon the selection of one or other set position "C" or "F", respectively.

Figure 7:
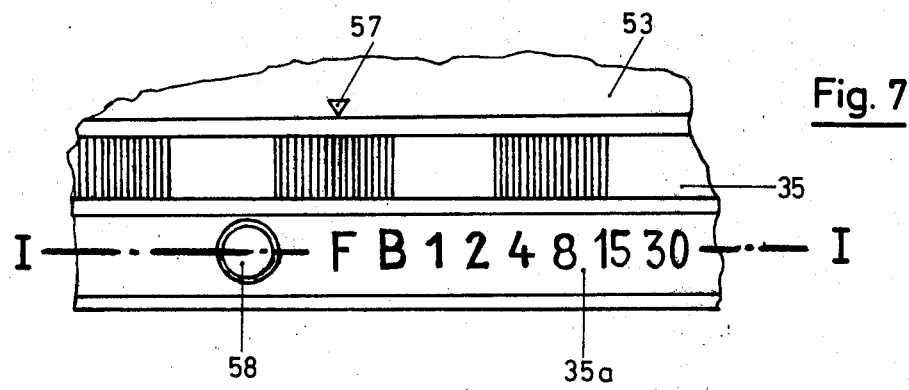
FIG. 7 is a partial view of the time adjuster of the camera of FIG. 6 set to the position "F"

If, as shown in FIG. 6, the focal plane shutter time adjuster 52 on the camera side is set to the particular set position "C" opposite the fixed mark 56, and if the camera is released, the film exposure is effected through the central shutter in the objective with the exposure time pre-set at its central shutter time adjuster 35. If, however, the central shutter time adjuster 35 on the objective side is set to the additional set position "F" opposite the fixed mark 57, as is shown in FIG. 7, then the focal plane shutter in the camera body exposes the film with the exposure time pre-selected at the focal plane time adjuster 52 when a photograph is taken.

Since the set position "F" in respect of its functional significance differs basically from that of the scale values of the central shutter time adjuster 35, precautions are to be taken to avoid incorrect settings, such precautions, on the one hand, preventing the camera user from setting the central shutter time adjuster 35 unintentionally to the particular set position "F" and, on the other hand, not permitting an inadvertent unintentional return of the time adjuster to one of the scale values of the time scale 35a.

Figure 8:
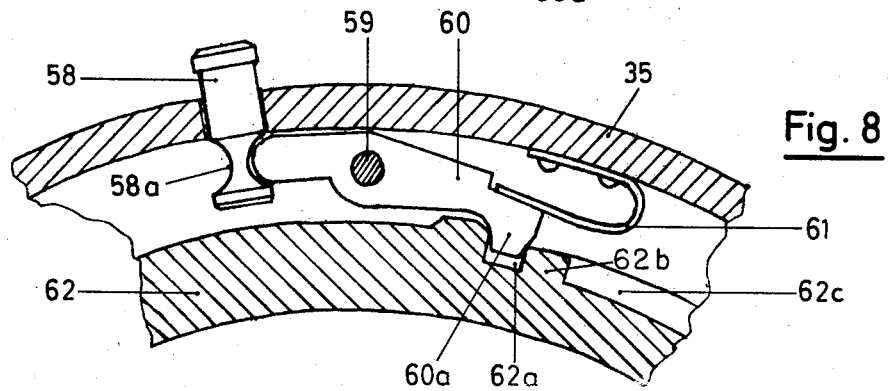
FIG. 8 is a partial cross-section through the variable shutter objective along the section line I—I indicated in FIG. 7.

To effect this precautionary measure, the central shutter time adjuster 35 is provided with a locking mechanism. This locking mechanism includes a manually actuable push-button 58 and a double lever 60 which is rotatably mounted on an axle 59, one end of which lever 60 is loaded by a spring 61, preferably a leaf spring, and the other end of which lever 60 cooperates with the push-button 58 and engages in a groove-like recess 58a of the push-button 58. As can be seen especially from FIG. 8, the locking mechanism, which at one end is provided with a locking tooth 60a, cooperates with a recess 62a which is disposed on a rigid part 62, preferably the barrel, of the objective. Because of the positive and constant engagement of the locking tooth 60a in this recess 62a, the time adjuster 35 is protected from unintentional actuation after being set to the particular set position "F".

Opposite the recess 62a, defined by a material shoulder 62b, an annular groove 62c is incorporated into the barrel of the objective and its length corresponds at least to the extent of the time setting range of the time adjuster 35. If the camera user wishes to set the time adjuster 35 to the set position "F" shown in FIG. 7, or to change it from this position to a time value corresponding to the time scale 35a, both setting manipulations always presuppose the previous positive releasing actuation of the push-button 58 of the positive locking mechanisms 58–61 which permits the range change.

We claim:

1. Reflex camera of the type having a focal plane shutter, comprising:
    an objective containing a lens aperture and provided with a variable central shutter of the type adapted for operation between a basic open shutter position in which the lens aperture is fully open and a closed shutter position, and a central shutter drive for effecting opening and closing shutter operating movement, the central shutter being arranged for mounting a shutter segment system for operating movement adjustably backwards and forwards for opening and closing the lens aperture and which in the basic open shutter position fully clears the lens aperture,
    a focal plane time adjuster associated with the focal plane shutter and arranged for setting to a particular central shutter position "C" for operating the central shutter,
    a central shutter time adjuster associated with the central shutter and arranged for setting to a particular focal plane shutter position "F" which effects a "B" function for operating the focal plane shutter while the central shutter is in the basic open position,
    a diaphragm and a diaphragm preselecting adjuster arranged such that, before commencement of the operating movement of the central shutter, the diaphragm approaches a specific working aperture which is preselectable by means of the diaphragm preselecting adjuster, and
    a central shutter lock arranged such that upon setting the central shutter time adjuster to the focal plane shutter position "F" which effects a "B" function, the lock operates to block the central shutter drive from effecting closing shutter operating movement of the central shutter whereby to permit the focal plane shutter to be operated while the central shutter is in the basic position.

2. Camera according to claim 1 wherein the diaphragm is adjustable in an opening direction and in a closing direction, a spring loaded feed lever is provided for acting under a feed force upon the diaphragm in the closing direction, a spring loaded return lever is provided for acting under a return force upon the diaphragm in the opening direction, the central shutter is provided with a diaphragm cam adjuster having radial cams for urging the feed lever in the opposite direction against such feed force to an initial position for opening the diaphragm and for urging the return lever in the correspondingly opposite direction against such return force to an initial position for reloading the return lever, and a return lever lock is provided for locking the return lever in its initial position and which is drivable out of the locking position by the cam adjuster after a first phase of motion and a short intermediate stop in motion, as required for the functioning of the focal plane shutter in the camera, in a following second phase of motion.

3. Camera according to claim 2 wherein the corresponding radial cam for urging the feed lever to such initial position is disposed on a pin mounted cam lever which is resiliently flexibly disposed on the cam adjuster.

4. Camera according to claim 3 wherein a cam lever push button or the like is arranged for controlling the pin mounted cam lever for permitting manual actuation of the feed lever.

5. Camera according to claim 1 wherein the central shutter time adjuster is provided with a time value adjustment scale corresponding to the extent of the time setting range of said time adjuster, and an actuatable central shutter time adjuster releasable lock mechanism arranged for permitting a setting of said time adjuster to the set position "F", or correspondingly a return from such set position "F" to a time value of the corresponding adjustment scale at another set position thereof, to be effected only after a previous releasing actuation of said lock mechanism.

6. Camera according to claim 5 wherein the lock mechanism is provided as a spring loaded double armed lever, which is arranged for actuation by a time adjuster push button, and which cooperates with an annular groove corresponding in extent to the extent of the time setting range of the central shutter time adjuster, and which also cooperates with a selective specific additional recess for releasably fixing said time adjuster in the set position "F".

7. Reflex camera of the type having a focal plane shutter, comprising:
- an objective containing a lens aperture and provided with a central shutter of the type adapted for operation between a basic open shutter position in which the lens aperture is fully open and a closed shutter position, and central shutter drive means for opening and closing shutter operating movement,
- a focal plane time adjuster associated with the focal plane shutter and arranged for setting to a particular central shutter control position for operating the central shutter,
- a central shutter time adjuster associated with the central shutter and arranged for setting to a particular focal plane shutter control position which effects a "B" function for operating the focal plane shutter while the central shutter remains in the basic open position,
- a diaphragm and diaphragm aperture preselecting adjustment means arranged for adjusting the diaphragm to a preselected working aperture before commencement of the operating movement of the central shutter, and
- central shutter drive lock means arranged, upon setting the central shutter time adjuster to the focal plane shutter control position which effects a "B" function, for blocking the central shutter drive means from effecting closing shutter operating movement of the central shutter whereby to permit the focal plane shutter to be operated while the central shutter remains in the basic open position.

8. Camera according to claim 7 wherein the diaphragm is adjustable in an opening direction and in a closing direction, diaphragm closing means are provided for resiliently urging the diaphragm in the closing direction under a closing force, diaphragm opening means are provided for resiliently urging the diaphragm in the opening direction under an opening force, diaphragm control adjustment means are provided for effecting operating phases of motion for correspondingly urging the diaphragm closure means in the opposite direction against the closing force to relieve the diaphragm from such closing force and for correspondingly urging the diaphragm opening means in the correspondingly opposite direction against the opening force to a basic cocked position to relieve the diaphragm from such opening force, and diaphragm opening means catching lock means are provided for releasably locking the diaphragm opening means in the basic cocked position, said diaphragm control adjustment means also being arranged such that, after a first operating phase of motion in which the diaphragm control adjustment means are released from urging the diaphragm closure means and from urging the diaphragm opening means while the diaphragm opening means remains locked in the basic cocked position, and after a short intermediate stop in motion corresponding to that required for the functioning of the focal plane shutter, said diaphragm control adjustment means in turn release the catching lock means in a following second phase of motion to permit the diaphragm opening means to urge the diaphragm in the opening direction.

9. Camera according to claim 8 wherein the diaphragm control adjustment means are operatively releasably connected with the diaphragm closing means, and manually controlled releasing means are provided for operatively disconnecting the diaphragm control adjustment means from the diaphragm closing means to permit manual control of the diaphragm closing means.

10. Camera according to claim 7 wherein the central shutter time adjuster is provided with a time value adjustment scale corresponding to the extent of the time setting range of said time adjuster, and a manually controlled releasable positive lock mechanism is arranged for permitting a setting of said time adjuster to the focal plane shutter control position which effects a "B" function, or correspondingly a return from said control position to a time value of the corresponding adjustment scale at another set position thereof, to be effected only after the preliminary positive releasing actuation of said locking mechanism.

* * * * *